US010860637B2

(12) United States Patent
Beller et al.

(10) Patent No.: US 10,860,637 B2
(45) Date of Patent: Dec. 8, 2020

(54) SYSTEM AND METHOD FOR RAPID ANNOTATION OF MEDIA ARTIFACTS WITH RELATIONSHIP-LEVEL SEMANTIC CONTENT

(71) Applicant: International Business Machines Corporation, Armonk, NY (US)

(72) Inventors: Charles E. Beller, Baltimore, MD (US); Chengmin Ding, Chantilly, VA (US); Adam D. Dumey, Falls Church, VA (US); Allen B. Ginsberg, St. Petersburg, FL (US); Elinna Shek, Aldie, VA (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 15/467,283

(22) Filed: Mar. 23, 2017

(65) Prior Publication Data
US 2018/0276207 A1    Sep. 27, 2018

(51) Int. Cl.
G06F 16/48    (2019.01)
(52) U.S. Cl.
CPC .................................. *G06F 16/48* (2019.01)
(58) Field of Classification Search
CPC ...................................................... G06F 16/48
See application file for complete search history.

(56) References Cited

U.S. PATENT DOCUMENTS 8,086,960 B1 * 12/2011 Gopalakrishna et al.
2011/0125734 A1    5/2011 Duboue et al.
(Continued)

FOREIGN PATENT DOCUMENTS

WO    WO2015114485 A1    8/2015

OTHER PUBLICATIONS

Yuan et al., "Watson and Healthcare," IBM developerWorks, 2011.
(Continued)

*Primary Examiner* — Hau H Hoang
(74) *Attorney, Agent, or Firm* — Troutman Pegger Hamilton Sanders LL

(57) ABSTRACT

Embodiments can provide a computer implemented method, in a data processing system comprising a processor and a memory comprising instructions which are executed by the processor to cause the processor to implement a media artifact annotation system, the method comprising inputting one or more relationships; for each of the one or more relationships, extracting, through an entity argument extraction module, one or more entity arguments; constructing, through a media query construction module, a media query using the one or more entity arguments; submitting the media query to a media search corpus; receiving search results comprising one or more media artifacts from the media search corpus; passing, through an annotation module, the search results to an annotator; receiving, through a response input module, one or more responses regarding each of the one or more media artifacts from the annotator; if the response for the media artifact is confirmatory, applying an annotation to the media artifact; and if the response for the media artifact is rejection, applying no annotation to the media artifact.

15 Claims, 4 Drawing Sheets

(56) References Cited

U.S. PATENT DOCUMENTS

| | | | |
|---|---|---|---|
| 2011/0282867 A1* | 11/2011 | Palermiti, II | G06F 17/30268 |
| | | | 707/722 |
| 2012/0011428 A1* | 1/2012 | Chisholm | G06F 16/313 |
| | | | 715/230 |
| 2014/0101162 A1 | 4/2014 | Hsueh et al. | |
| 2015/0242387 A1 | 8/2015 | Rachevsky et al. | |
| 2015/0324433 A1* | 11/2015 | Duffy | G06F 17/30554 |
| | | | 707/722 |
| 2017/0185869 A1* | 6/2017 | Dua | G06K 9/52 |
| 2017/0228372 A1* | 8/2017 | Moreno | G06F 17/30654 |

OTHER PUBLICATIONS

Rob High, "The Era of Cognitive Systems: An Inside Look at IBM Watson and How it Works," IBM Redbooks, 2012.

Morrison et al., "IBM Lotus Discovery Server," IBM Redbooks, 2001.

Wang et al., "AnnoSearch: Image Auto-Annotation by Search," 2006 IEEE Computer Society Conference on Computer Vision and Pattern Recognition, Jun. 17-22, 2006.

Bloehdorn et al. "Semantic Annotation of Images and Videos for Multimedia Analysis," The Semantic Web: Research and Applications. ESWC 2005. Lecture Notes in Computer Science, vol. 3532.

Zunjarwad et al. "Contextual Wisdom: Social Relations and Correlations for Multimedia Event Annotation," MM '07, Sep. 23-28, 2007, Augsburg, Bavaria, Germany.

\* cited by examiner

US 10,860,637 B2

SYSTEM AND METHOD FOR RAPID ANNOTATION OF MEDIA ARTIFACTS WITH RELATIONSHIP-LEVEL SEMANTIC CONTENT

STATEMENT REGARDING FEDERALLY SPONSORED RESEARCH OR DEVELOPMENT

This invention was made with government support under contract number 2013-12101100008 awarded by United States defense agencies. The government has certain rights to this invention.

TECHNICAL FIELD

The present application relates generally to a system and method that can be used to annotate a media corpus with relationship-level semantic information between two entities. The system and method can provide additional evidence or analytics to a question-answering system using a knowledge graph.

BACKGROUND

Media artifacts in a media corpus can include items like image files, audio files, and video files. Currently, semantic annotation of image and other media files is typically confined to low level features (e.g., colors), scene information (e.g., 'beach,' 'city'), or entity level tags (e.g., 'Barack Obama'). Relationship level semantic information refers to tags that consist of, at minimum, two separate entities and a relationship label, for example "Barack Obama" resides at the "White House."

Cognitive discovery tools like Watson Discovery Advisor (WDA) can currently be queried with entities to retrieve relationships with connected entities, e.g., a query 'Barack Obama' can return relationships like "Barack Obama" is the spouse of "Michelle Obama," and "Barack Obama" was president of the "United States." Evidence from each text document analyzed is provided for each returned relationship.

A cognitive discovery tool can benefit from being able to use non-text media as evidence for relationship queries. Currently, no large corpus of media documents exists with relationship-level semantic annotations. Further, an open-ended task like relationship-labeling on media documents can be extremely expensive.

SUMMARY

Embodiments can provide a computer implemented method, in a data processing system comprising a processor and a memory comprising instructions which are executed by the processor to cause the processor to implement a media artifact annotation system, the method comprising inputting one or more relationships; for each of the one or more relationships, extracting, through an entity argument extraction module, one or more entity arguments; constructing, through a media query construction module, a media query using the one or more entity arguments; submitting the media query to a media search corpus; receiving search results comprising one or more media artifacts from the media search corpus; passing, through an annotation module, the search results to an annotator; receiving, through a response input module, one or more responses regarding each of the one or more media artifacts from the annotator; if the response for the media artifact is confirmatory, applying an annotation to the media artifact; and if the response for the media artifact is rejection, applying no annotation to the media artifact.

Embodiments can further provide a method further comprising if the response for the media artifact is modification, passing the media artifact to a second tier annotator; receiving one or more responses regarding the media artifact from the second tier annotator; and if the response from the second tier annotator is to modify, modifying the annotation to the media artifact; and if the response from the second tier annotator is rejection; applying no annotation to the media artifact.

Embodiments can further provide a method further comprising inputting one or more relationship deriving from a knowledge graph database.

Embodiments can further provide a method wherein the one or more media artifacts are image, audio, text, or video files.

Embodiments can further provide a method further comprising incorporating the one or more annotated media artifacts into a cognitive system.

Embodiments can further provide a method further comprising displaying the media artifact to the annotator through a media artifact display.

Embodiments can further provide a method further comprising displaying one or more response choices to the annotator through a relation question display.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a media artifact annotation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
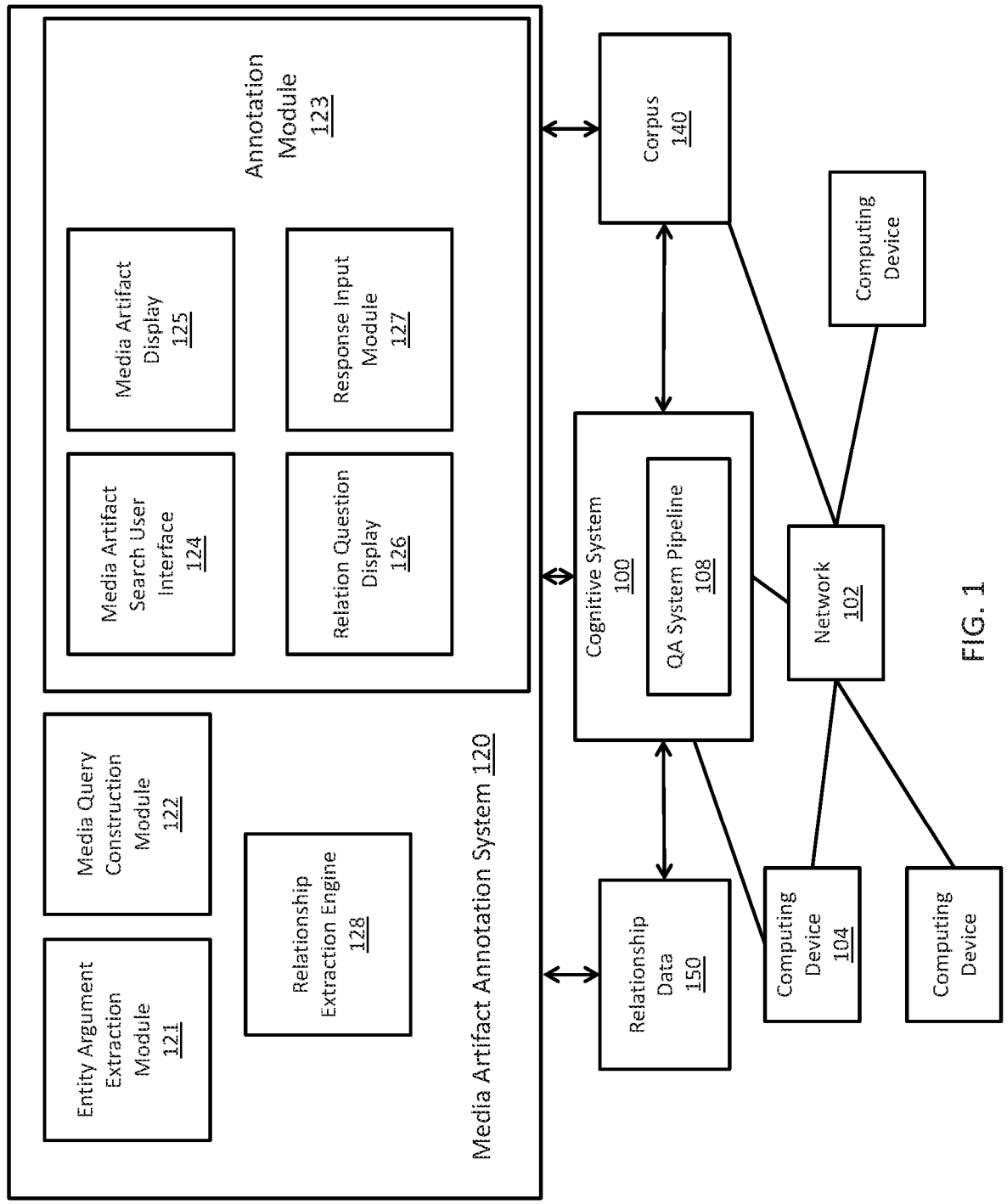
FIG. 1 depicts a schematic diagram of one illustrative embodiment of a cognitive system implementing a media artifact annotation system in a computer network.

The media artifact annotation system and method can provide a framework for building a corpus by efficiently constraining the use of difficult open-ended labeling judgements. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured data

Generate and evaluate hypotheses

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes, and traits from natural language

Deduce various language specific or agnostic attributes from natural language

High degree of relevant recollection from data points (images, text, voice) (memorization and recall)

Predict and sense with situation awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

FIG. 1 depicts a schematic diagram of one illustrative embodiment of a cognitive system 100 implementing a question and answer (QA) pipeline 108 and a media artifact annotation system 120 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables media artifact annotation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 140. In an embodiment, improved search queries can be generated and entered into the QA system using the media artifact annotation system 120 described herein. The cognitive system 100 parses and interprets an improved search query via a QA pipeline 108, and provides a response containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question (which can be an improved search query generated by the media artifact annotation system 120), which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate a ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for implementing a media artifact annotation system 120. As described further in FIGS. 3 and 4, the media artifact annotation system 120 can receive one or more relationships from a set of relationship data 150, which can be located in a repository of query data. Alternatively, the one or more relationships can be received from a repository of relationship extracted from the corpus 140 by a relationship extraction engine 128. The media artifact annotation system 120 can annotate media artifacts based upon the relationship data 150 using an entity argument extraction module 121, a media query construction module 122, and an annotation module 123. The annotation module 123 can contain a media artifact search user interface 124, a media artifact display 125, a relation question display 126, and a response input module 127. The modules can be implemented in software, hardware, or a combination thereof.

Figure 2:
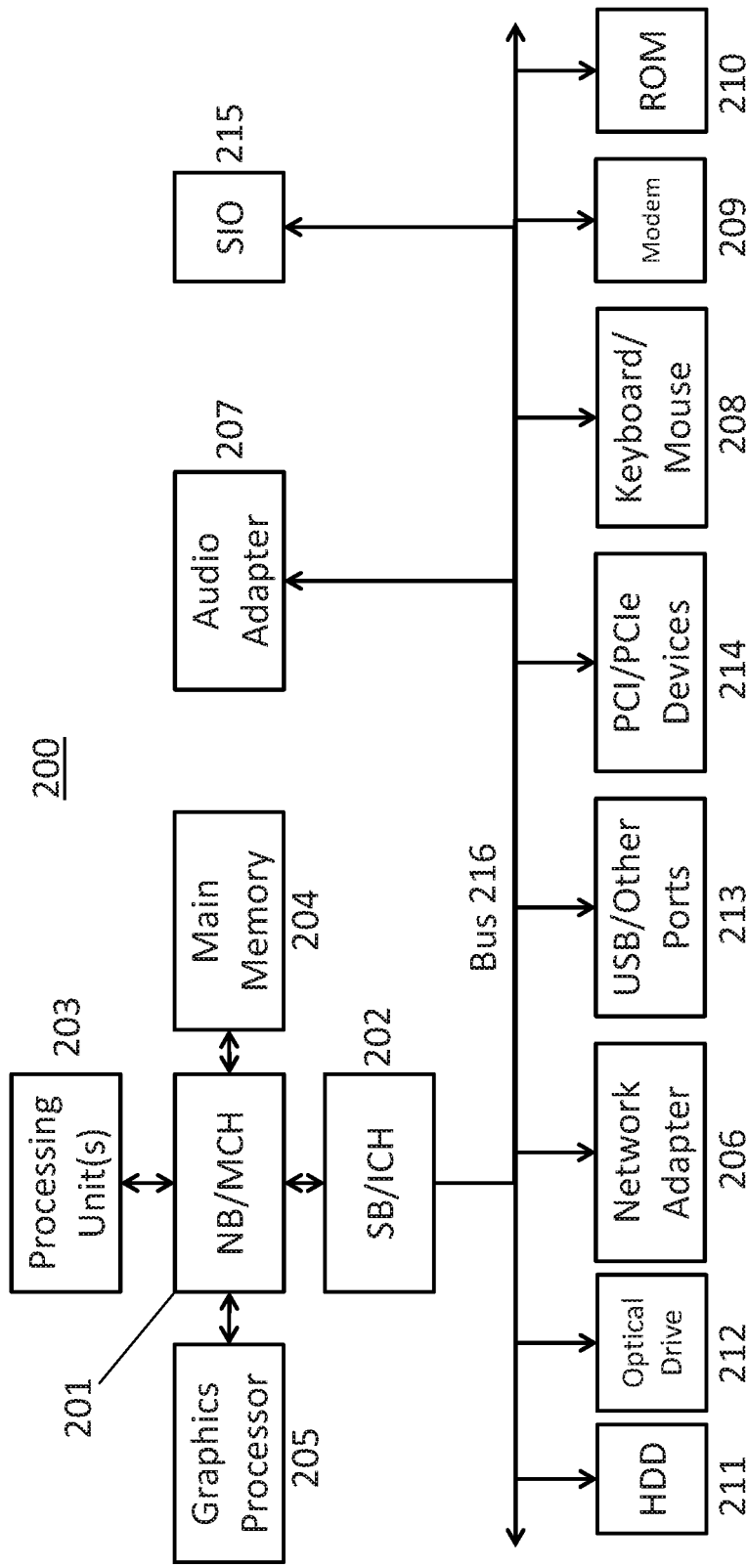
FIG. 2 is a block diagram of an example data processing system in which aspects of the illustrative embodiments may be implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the media artifact annotation system 120 and cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the media artifact annotation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
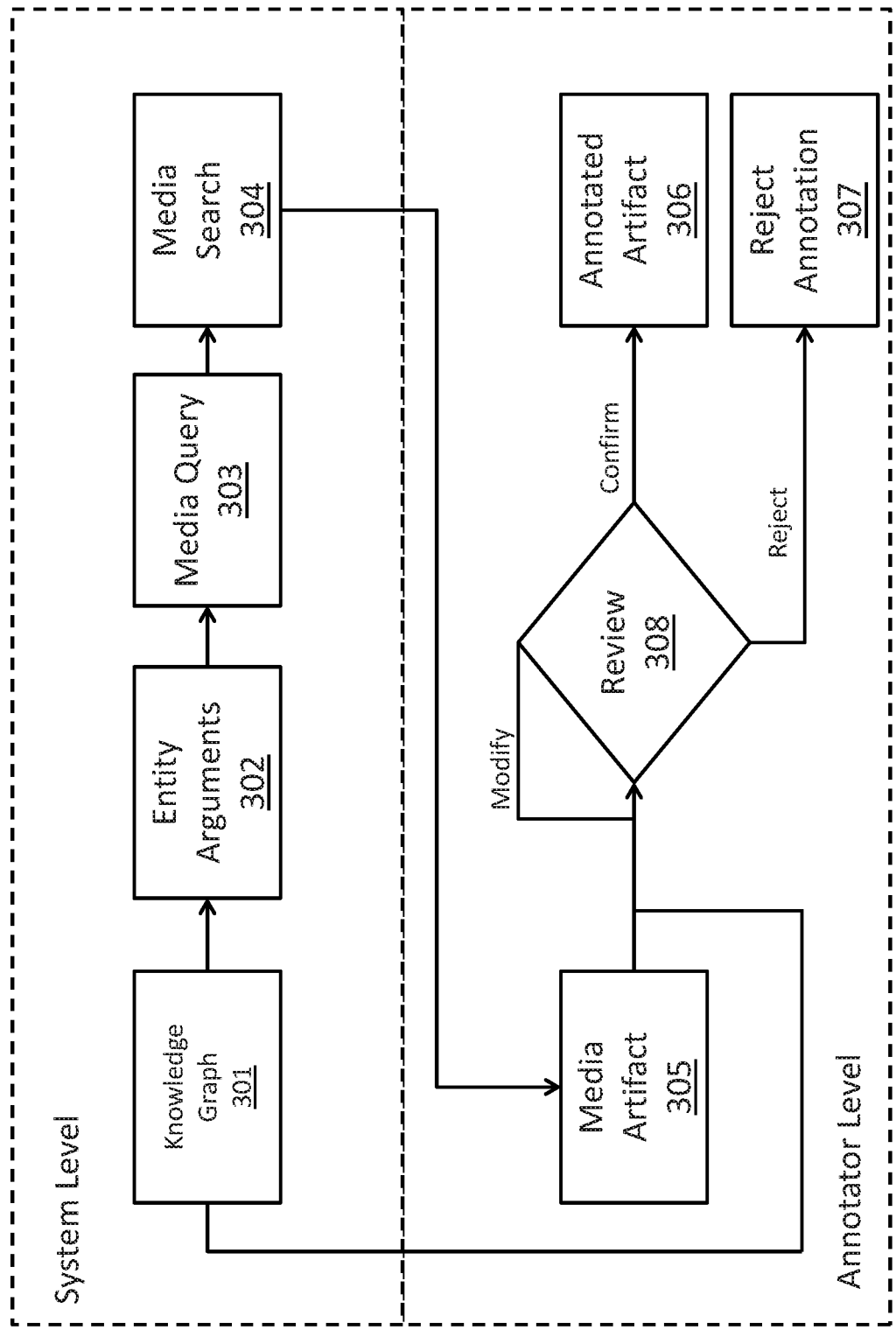
FIG. 3 illustrates a workflow diagram depicting the function of a media artifact annotation system, according to embodiments described herein.
Figure 4:
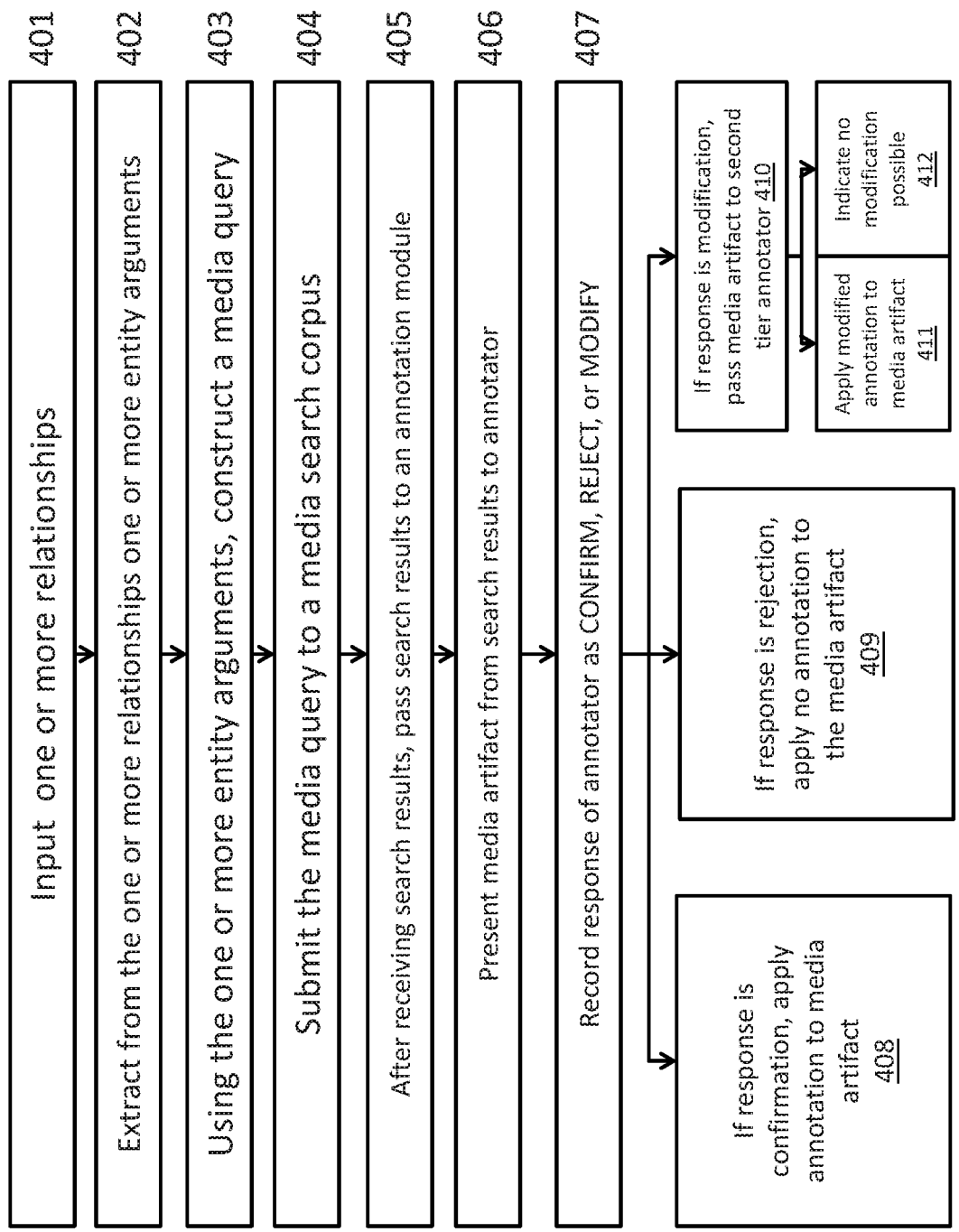
FIG. 4 illustrates a flowchart diagram depicting the function of a media artifact annotation system, according to embodiments described herein.

FIGS. 3 and 4 illustrate a workflow and flowchart describing the functionality of a media artifact annotation system, as described in accordance with embodiments described herein. The media artifact annotation system can provide a framework for building a large corpus of media artifacts with relationship-level semantic annotations by efficiently constraining the use of difficult open-ended labeling judgements. Media artifacts can include, but are not limited to, documents, image files, media files, video files, or audio files.

The media artifact annotation system can first input one or more relationships 401, which can be in the form of one or more rows of a knowledge graph 301 or other relational database. The system can then extract one or more entity arguments 302 from the one or more relationships 402, using the entity argument extraction module (121 as shown in FIG. 1). For example, for a relationship such as "Stephen Curry is a member of the Golden State Warriors," the entities extracted can be "Stephen Curry" and "Golden State Warriors." Using the one or more entity arguments 302, the system can then construct a media query 303 using those arguments 403, using the media query construction module (122 as shown in FIG. 1). This can allow preparation for a search for media artifacts that can contain entity-level semantics to match the entities from the relationship 401. Then, the system can perform a media search 304 by submitting the media query 303 to a media search corpus 404. In submitting the media query 303 to a media search corpus 404, the system can retrieve one or more media artifacts 305 from the media search 304.

Once the media artifact annotation system has received the search results, which can be one or more media artifacts 305, those search results can be passed to an annotation module 405. Within the annotation module, the one or more media artifacts 305 can be presented to an annotator 406. In an embodiment, the annotator can be a human. The annotation module can prompt the annotator to determine if the particular media artifact provides evidence that the relationship and the entity arguments are true for that particular media artifact. In an embodiment, the annotator can be prompted with a choice to confirm, reject, or modify through a review 308. The system can record the response of the annotator as confirm, reject, or modify 407.

The annotator can interact with the annotation module (123 as shown in FIG. 1) through the use of the media artifact search user interface (124 as shown in FIG. 1), which can be used by the annotator to interact and search for various media artifacts. The media artifact display (125 as shown in FIG. 1) can be a screen through which the annotator can be shown the desired media artifact. The relation question display (126 as shown in FIG. 1) can be used by the annotation module to display the confirmation, rejection, or modification choices, and can be used in conjunction with the media artifact display. The response input module (127 as shown in FIG. 1) can be used to record the choice of confirm, reject, or modify input by the annotator.

If the annotator response is to confirm, the system can apply the sampled annotation to the media artifact 408, in order to create an annotated artifact 306. For example, if a media artifact displayed to the annotator showed Stephen Curry in a Golden State Warriors jersey, the image can be properly confirmed and the annotation can be applied to this particular media artifact. If the annotator response is to reject, the system will apply no annotation to the media artifact 409, leading to a reject annotation state 307. For example, if the media artifact displays a golfer playing golf, the image can be properly rejected. If the annotator response is modify, the system can pass the media artifact to a second tier annotator 410. In an embodiment, the second tier annotator can be a human. The second tier annotator can create a modified annotation, which can be applied to the media artifact 411, or the second tier annotator can indicate that no modification is possible 412. The annotated media artifacts can be re-integrated into the corpus used by the overall cognitive system.

In the example used previously, a modification response can be appropriate if the media artifact displayed to the annotator showed Klay Thompson (a teammate of Stephen Curry) playing in a Golden State Warriors jersey: while the relationship shown in the media artifact is close to the example relationship being requested, it is not adequate for a confirmation response from the annotator. The relationship/media artifact pairs designated as modify can be passed to a second tier annotator with more experience, and who can update the relationship in question, which can in turn be re-entered into the relationship set. One use for the media artifact annotation system can be to automatically learn novel relationships from media artifacts. Once a sufficiently large corpus with annotations is built up, it can be used to learn novel relationships by leveraging enabling art from image similarity.

The media artifact annotation system can provide a clean and simple workflow for the annotation of media artifacts (image, audio, video, etc.) with relationship-level semantic information. The media artifact annotation system can also take relationship instances from a particular domain as input and can use media as evidence, sometimes with the help of human judgment. This represents an inverse of the traditional semantic annotation approach that takes media as an input and then annotates it. Lastly, the media artifact annotation system can use a cooperative approach that leverages machine-based media search and human refinement capability that can collectively provide an effective and robust relation annotation approach. Advantages of the media artifact annotation system can include a minimization of labor costs associated in annotating multimedia sources, as well as an increase in relationship identification and linkage between entities.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method, in a data processing system comprising a processor and a memory comprising instructions which are executed by the processor to cause the processor to implement a media artifact annotation system implemented on a cognitive system, the method comprising:
    inputting relationship-level semantic information;
    extracting, through an entity argument extraction module, at least two human entity arguments from the relationship-level semantic information, wherein the at least two human entity arguments have a particular relationship;
    constructing, through a media query construction module, a media query using the at least two human entity arguments;
    submitting the media query to a media search corpus;
    receiving search results comprising one or more media artifacts from the media search corpus, wherein each media artifact is an audio file;
    passing, through an annotation module, the search results to an annotator;
    for each audio file, determining, by the annotator, if the particular relationship between the at least two human entity arguments is shown in the each audio file;
    receiving, through a response input module, one or more responses regarding each media artifact from the annotator to indicate whether the particular relationship between the at least two human entity arguments is shown in the each media artifact;
    if the response for the media artifact is modification, passing the media artifact to a second tier annotator;
    receiving one or more responses regarding the media artifact from the second tier annotator;
    if the response from the second tier annotator is to modify, modifying the annotation to the media artifact;
    if the response from the second tier annotator is rejection, applying no annotation to the media artifact, and
    incorporating the one or more annotated media artifacts into the cognitive system.

2. The method as recited in claim 1, further comprising: inputting the relationship-level semantic information deriving from a knowledge graph database.

3. The method as recited in claim 1, further comprising: displaying the media artifact to the annotator through a media artifact display.

4. The method as recited in claim 1, further comprising: displaying one or more response choices to the annotator through a relation question display.

5. The method as recited in claim 1, wherein
    if the response for the media artifact is confirmatory indicating the particular relationship between the at least two human entity arguments is shown in the media artifact, applying an annotation to the media artifact;
    if the response for the media artifact is rejection indicating the particular relationship between the at least two human entity arguments is not shown in the media artifact, applying no annotation to the media artifact.

6. A computer program product for media artifact annotation implemented on a cognitive system, the computer program product comprising a non-transitory computer readable storage medium having program instructions embodied therewith, the program instructions executable by a processor to cause the processor to:
    input relationship-level semantic information;
    extract, through an entity argument extraction module, at least two human entity arguments from the relationship-level semantic information, wherein the at least two human entity arguments have a particular relationship;
    construct, through a media query construction module, a media query using the at least two human entity arguments;
    submit the media query to a media search corpus;
    receive, though a response input module, search results comprising one or more media artifacts from the media search corpus, wherein each media artifact is an audio file;
    pass the search results to an annotator;
    for each audio file, determine, by the annotator, if the particular relationship between the at least two human entity arguments is shown in the each audio file;
    receive one or more responses regarding each media artifact from the annotator to indicate whether the particular relationship between the at least two human entity arguments is shown in the each media artifact;
    if the response for the media artifact is modification, passing the media artifact to a second tier annotator;
    receiving one or more responses regarding the media artifact from the second tier annotator;
    if the response from the second tier annotator is to modify, modifying the annotation to the media artifact;
    if the response from the second tier annotator is rejection, applying no annotation to the media artifact, and
    incorporate the one or more annotated media artifacts into the cognitive system.

7. The computer program product as recited in claim 6, wherein the processor is further caused to:
    input the relationship-level semantic information deriving from a knowledge graph database.

8. The computer program product as recited in claim 6, wherein the processor is further caused to:
   display the media artifact to the annotator through a media artifact display.

9. The computer program product as recited in claim 6, wherein the processor is further caused to:
   display one or more response choices to the annotator through a relation question display.

10. The computer program product as recited in claim 6, wherein the processor is further caused to:
   if the response for the media artifact is confirmatory indicating the particular relationship between the at least two human entity arguments is shown in the media artifact, apply an annotation to the media artifact;
   if the response for the media artifact is rejection indicating the particular relationship between the at least two human entity arguments is not shown in the media artifact, apply no annotation to the media artifact.

11. A system for annotating media artifacts implemented on a cognitive system, comprising:
   a microprocessor configured to:
      input relationship-level semantic information;
      extract, through an entity argument extraction module, at least two human entity arguments from the relationship-level semantic information, wherein the at least two human entity arguments have a particular relationship;
      construct, through a media query construction module, a media query using the at least two human entity arguments;
      submit the media query to a media search corpus;
      receive, though a response input module, search results comprising one or more media artifacts from the media search corpus, wherein each media artifact is an audio file
      pass the search results to an annotator;
      for each audio file, determine, by the annotator, if the particular relationship between the at least two human entity arguments is shown in the each audio file;
      receive one or more responses regarding each of the one or more media artifacts from the annotator to indicate whether the particular relationship between the at least two human entity arguments is shown in the each media artifact;
      if the response for the media artifact is modification, passing the media artifact to a second tier annotator;
      receiving one or more responses regarding the media artifact from the second tier annotator;
      if the response from the second tier annotator is to modify, modifying the annotation to the media artifact;
      if the response from the second tier annotator is rejection, applying no annotation to the media artifact, and
      incorporate the one or more annotated media artifacts into the cognitive system.

12. The system as recited in claim 11, wherein the microprocessor is further configured to:
   input the relationship-level semantic information deriving from a knowledge graph database.

13. The system as recited in claim 11, wherein the microprocessor is further caused to:
   display the media artifact to the annotator through a media artifact display.

14. The system as recited in claim 11, wherein the microprocessor is further caused to:
   display one or more response choices to the annotator through a relation question display.

15. The system as recited in claim 11, wherein the microprocessor is further configured to:
   if the response for the media artifact is confirmatory indicating the particular relationship between the at least two human entity arguments is shown in the media artifact, apply an annotation to the media artifact;
   if the response for the media artifact is rejection indicating the particular relationship between the at least two human entity arguments is not shown in the media artifact, apply no annotation to the media artifact.

* * * * *